No. 747,067. PATENTED DEC. 15, 1903.
A. J. HEINE.
BAND CUTTER AND FEEDER.
APPLICATION FILED JAN. 2, 1902.
NO MODEL. 3 SHEETS—SHEET 1.
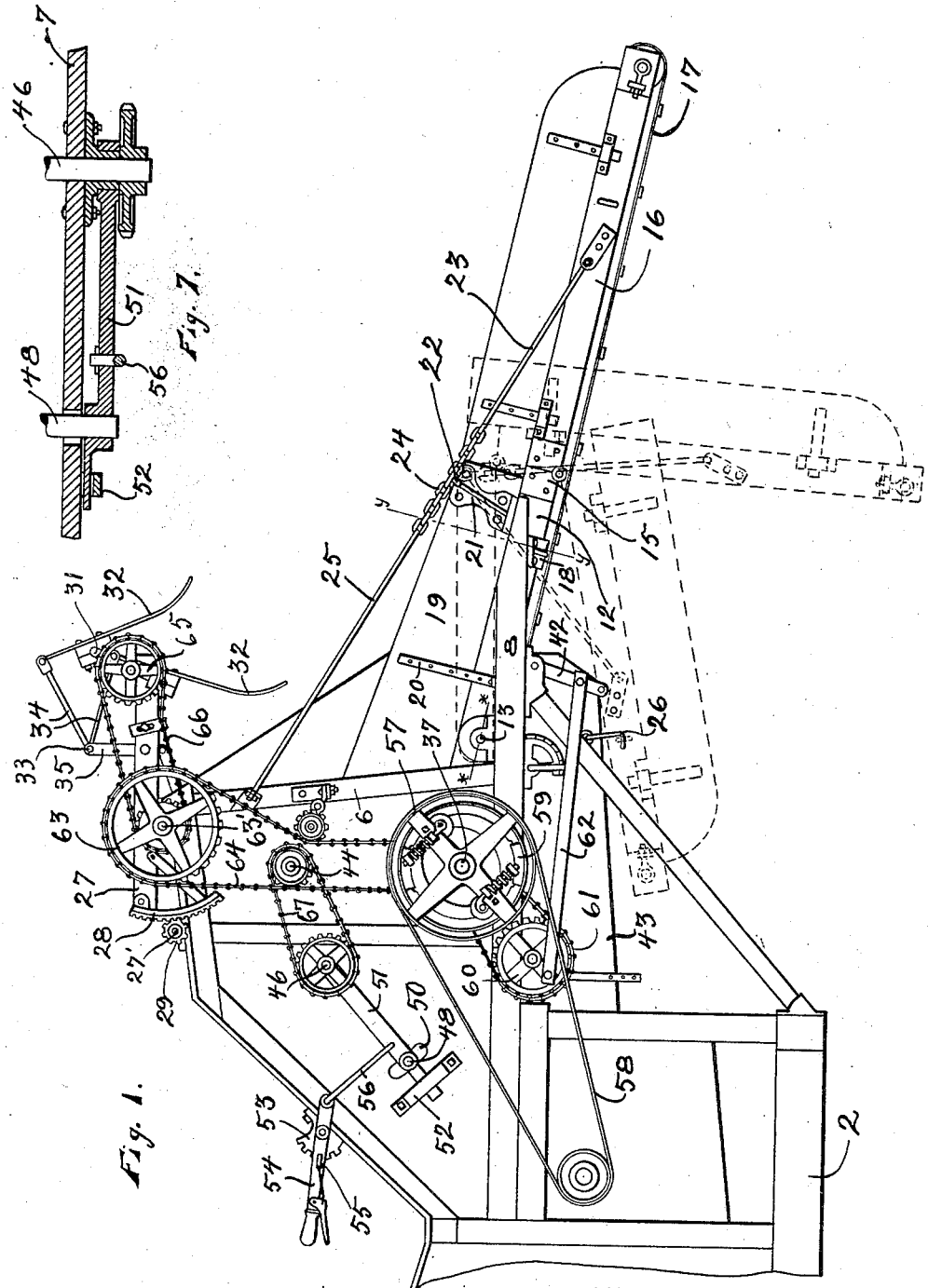
WITNESSES.
INVENTOR.
AUGUST J. HEINE
BY
ATTORNEYS.

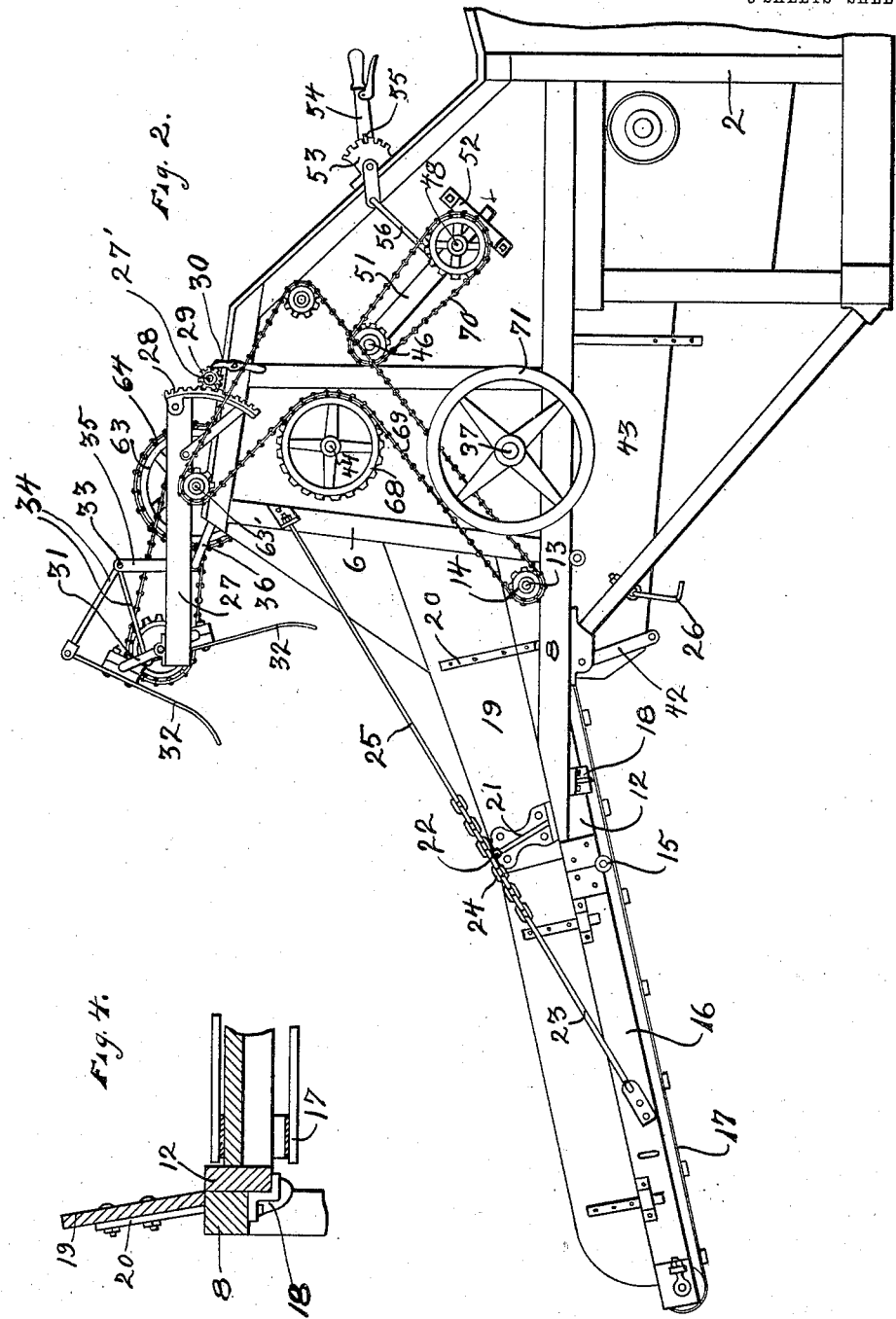

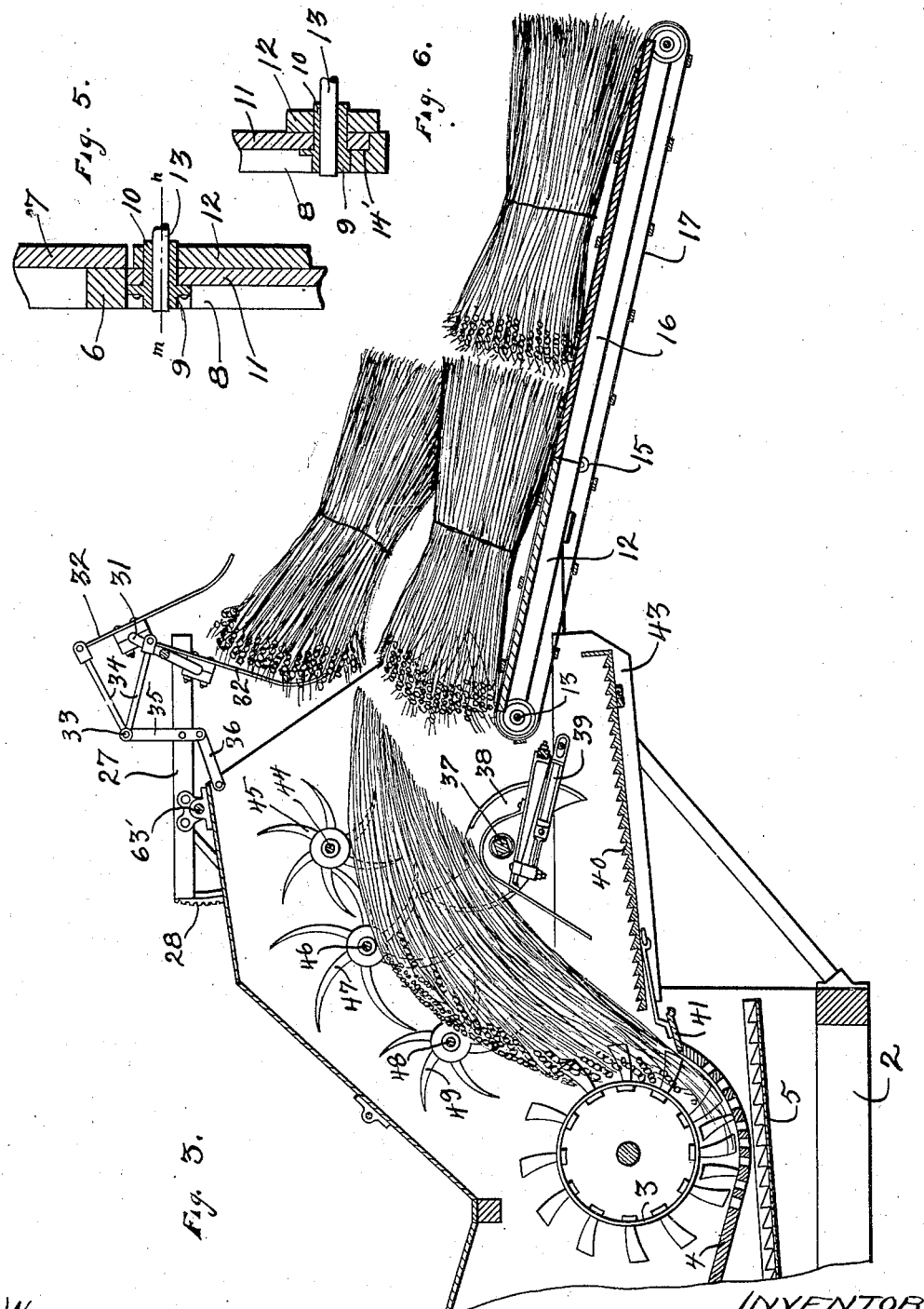

No. 747,067. Patented December 15, 1903.

UNITED STATES PATENT OFFICE.

AUGUST J. HEINE, OF WAHPETON, NORTH DAKOTA, ASSIGNOR TO THE HEINE MANUFACTURING COMPANY, OF WAHPETON, NORTH DAKOTA, A CORPORATION OF NORTH DAKOTA.

BAND-CUTTER AND FEEDER.

SPECIFICATION forming part of Letters Patent No. 747,067, dated December 15, 1903.

Application filed January 2, 1902. Serial No. 88,018. (No model.)

*To all whom it may concern:*

Be it known that I, AUGUST J. HEINE, of Wahpeton, Richland county, North Dakota, have invented certain new and useful Improvements in Band-Cutters and Feeders, of which the following is a specification.

My invention relates to band-cutters and feeders for threshing-machines.

The object of the invention is to simplify and improve the retarding devices shown and described in Letters Patent of the United States granted to me May 2, 1899, No. 624,023.

A further object is to adapt the feeder for handling wet heavy grain efficiently by providing more room for the loosening, shaking, and spreading action of the knives.

A further object is to provide means to prevent the piling up of grain in front of the cylinder and the feeding of the grain in bunches thereto.

Other objects of the invention will appear from the following detailed description.

The invention consists generally in providing a series of retarding wheels or pickers operating at different speeds above the band-cutters.

Further, the invention consists in providing means for adjusting one of the wheels toward or from the cutters to adapt the device for different kinds of grain.

Further, the invention consists in an improved folding bundle-carrier.

Further, the invention consists in various constructions and combinations, all as hereinafter described, and particularly pointed out in the claims.

In the accompanying drawings, forming part of this specification, Figure 1 is a side elevation of a band-cutter and feeder embodying my invention. Fig. 2 is a similar view of the opposite side of the machine. Fig. 3 is a longitudinal vertical section. Fig. 4 is a partial section on the line $y\ y$ of Fig. 1. Fig. 5 is a section on the line $x\ x$ of Fig. 1. Fig. 6 is a section on the line $m\ m$ of Fig. 5. Fig. 7 is a detailed section of the mechanism whereby one of the retarder-wheel shafts is rendered vertically adjustable.

In the drawings, 2 represents the frame of the separator; 3, the cylinder; 4, the concave, beneath which is the usual pan 5.

6 represents the upper part of the feeder-frame, 7 the casing, and 8 the horizontal timbers at the base of the feeder-frame and projecting out beneath the carrier. Upon the timbers 8 I arrange castings 9, having hollow hubs 10, passing through boards 11 and the frame 12 of the inner carrier-section. The shaft 13 at the inner end of the carrier passes through said hubs and is provided with a sprocket 14. The timbers 8 upon each side of the carrier are provided with rabbets 14' to receive the edges of the boards 11, so that the carrier-frame 12 will be substantially flush with the casing 7 of the feeder, as shown in Fig. 5. This construction allows the use of a carrier the full width of the feeder, whereas ordinarily it has been necessary to make it several inches narrower, the boards 11 being usually set inside the frame of the feeder and in line with its casing. The inner end of the frame 12 swings freely on the hubs 10, and its outer end is connected by hinges 15 with the outer section 16 of the carrier-frame. A slatted belt 17 operates over the shaft 13 and a similar shaft at the outer end of the frame 16 in the usual manner. The outer end of the frame 12 rests upon the castings 18, and above said frame upon the timbers 8 are the usual outwardly-inclined boards 19, held in place by straps 20, and the brackets 21, that are provided near their upper ends with outwardly-turned lugs 22. The outer section 16 of the carrier-frame has rods 23 pivotally connected therewith, and said rods are connected by chains 24 to rods 25, that are secured to the feeder-frame. The chains 24 pass over the lugs 22 and turn thereon when the carrier is being folded.

In Fig. 1 I have shown in dotted lines the various positions assumed by the carrier-frame while being folded. From an examination of this figure it will be noted that when the operator breaks the joint between the carrier-sections and raises the pivots of the hinges sufficiently to pass an imaginary line drawn between the points of connection of the rods 23 on the outer carrier-frame and the pivots of the inner carrier-frame section the chains 24, resting on the lugs 22, will while the outer section is being swung to its inoperative position beneath the feeder cause the hinged outer end of the inner section and the whole outer section to be raised bodily without any additional effort on the part of the operator. My object in so raising the hinged ends of the sections is to allow the outer section to clear the pole and avoid the necessity of lifting the whole carrier-frame, which the operator is obliged to do when folding the carrier of a feeder as ordinarily constructed. I have found in the practical operation of my improved carrier that so much labor is saved in folding the same that the work can be done easily by a boy where ordinarily the strength of a man has been required. As soon as the outer section has been turned in beneath the feeder it is fastened in place by any suitable means, such as the hooks 26.

Above the inner end of the carrier I provide overhanging arms 27, having curved racks 28 to engage pinions 29, secured on a shaft 27' on the feeder-frame and locked by any suitable means, as by pawls 30. In the outer overhanging ends of said arms I arrange a crank-shaft 31, carrying a series of kickers 32, that are pivotally connected with a rod 33 by links 34, said rod being supported on sway-bars 35, that are pivoted on the arms 27 and connected with the feeder-casing by links 36.

Near the inner end of the carrier is a band-cutter shaft 37, carrying a series of knives 38, that are adapted to cut the bands and feed the grain toward the threshing-cylinder. In connection with these knives I have shown a knife-sharpening apparatus 39, which forms the subject-matter of a companion application herewith and needs no detailed description or illustration herein. Beneath the knives is the usual reciprocating pan 40 overhanging the feed-board 41 at its inner end and having the usual crank-shaft at its outer end supported upon links 42 from the feeder-frame. This pan is inclosed at the sides by the usual boards 43. Above the band-cutters I provide a revolving shaft 44, whereon a series of picker-wheels 45 are arranged. These wheels revolve slower than the band-cutters and faster than the bundle-carrier and serve to retard the bundles while the bands are being cut and the grain loosened and spread by the knives. Near the shaft 44 is a second shaft 46, also carrying a series of retarding-wheels 47, that are larger than the wheels 45, but revolve preferably at a slower speed and lap by and coöperate with the fingers of said wheels 45 to engage and hold back the tops of the bundles. The wheels 47 are preferably a little in advance of the band-cutter shaft and do not usually engage the bundles until after the bands have been cut and are adapted to retard the upper portions thereof, while the cutters spread, loosen, and feed forward the lower portions. Near the shaft 46 is a third shaft 48, carrying a third set of retarding-wheels 49, having a slower speed, preferably, than either of the other sets and particularly adapted to prevent the grain from piling up in front of the cylinder or feeding into the cylinder in bunches and being therefore only partially threshed. The fingers of the diffferent sets of retarding-wheels, as heretofore indicated, lap by those of the adjoining set, so that each set will clear the grain from the fingers of the preceding set and prevent all danger of its winding on the shafts. By dispensing with the apron or belt shown in my patent above referred to I am able to provide a greater space above the band-cutters, wherein the grain may be shaken up and spread before entering the cylinder, and this arrangement is particularly advantageous in handling damp heavy grain, which in order to insure good threshing must be thoroughly loosened and separated before feeding to the cylinder. I also provide a comparatively large unobstructed space between the band-cutters and the cylinder, where I am able to so thoroughly loosen and shake up the bundles that the lower portions thereof will slide down in a comparatively thin stream into the cylinder, while the tops will be held back by the retarding devices until relieved from pressure below, as by the forward feeding of the under body of grain, when the upper body also will drop down and slide into the cylinder. In this way the grain will pass almost continuously into the cylinder, and being spread and combed by the coöperation of the knives and retarding-wheels the heads will be exposed to the action of the cylinder and a practically perfect threshing obtained.

In practice I have found it advisable in order to secure the best results to drive the first set of wheels at a higher speed than the others and the carrier and considerably slower than the knives. The second set of wheels is preferably revolved faster than the third set, and their fingers are preferably longer than those of the other sets, so that said second wheels will satisfactorily perform their function of retarding the tops of the bundles and at the same time permit the location of their shaft a sufficient distance away from the cutters to insure plenty of space for shaking up and spreading the grain. The shaft 48 of the third set of retarding-wheels projects, preferably, through slots 50 in the feeder-casing and is mounted in bars 51, that are supported at one end on the shaft of the second set of wheels, while their other ends move within guides 52 on said casing. Above the shaft 48 is a rod 48', provided with a lever 53, having a latch to engage a quadrant 54. A crank 55 is provided on the opposite end of the rod 48', and said lever and crank are connected with the bars 51 by rods 56. Movement of the lever 53 will operate the bars 51 and raise or lower the third set of retarding-wheels for the purpose of adapting them to thresh different kinds of grain, as some require these wheels to be in their lowest position to obtain the best results, while other kinds thresh better when they are near the top of the feeder-casing or at an intermediate point to their lowest and highest position. The retarding and other mechanism may be driven by any suitable means; but I prefer a pulley 57 on the band-cutter shaft connected by a belt 58 with the cylinder and provided with a friction-governor 59. A sprocket 60 is connected with a chain 61 with a similar sprocket (not shown) on the band-cutter shaft, and said sprocket 60 is connected by a pitman 62 with one of the links 42 and whereby the pan 40 is reciprocated. On the shaft 63' is a large sprocket 63, driven by a chain 64 from the band-cutter shaft, and a small sprocket on the shaft 63' drives a similar sprocket 65 on the crank-shaft 31 through a chain 66. Suitable sprockets are provided on the shafts of the first and second set of retarding-wheels connected by a chain 67.

On the opposite side of the machine the shaft 44 has a large sprocket 68, over which a chain 69 passes to sprockets on the shaft 63' and the shaft 13. The shaft of the second set of retarding-wheels is connected with the shaft 48 of the third set by a chain 70. A fly-wheel 71 is preferably provided on the shaft 37 of the band-cutters.

The operation of my improved band-cutter is as follows: The apparatus having been set in motion, bundles of grain are placed upon the carrier and advanced thereby toward the band-cutting knives. As the bundles approach the knives they will pass under the feed-limiting mechanism or kickers, which will permit a single bundle or layer of bundles on the carrier to pass freely into the machine, but will hold back or throw off any bundle that is not properly placed or is put on top of another bundle. The kickers have a downward-and-forward movement toward the receiving end of the carrier and engage the upper bundles, if they are fed in layers two bundles deep, and will toss or throw them back toward the receiving end of the carrier, preventing the bundles from being fed too rapidly and clogging the band-cutting knives and the cylinder. The feed-limiting mechanism can be readily adjusted according to the size of the bundles that are fed into the machine and will stop and throw back any that are not properly placed on the carrier. After the bundles pass under the kicker they will be engaged first by the forward set of retarding-wheels and the bundles held back or retarded while the bands are being cut by the knives. About the time the bands are cut the bundles will be engaged by the fingers of the second set of wheels, which will hold back the grain and enable the rapidly-revolving knives to thoroughly spread and shake up the bundle and fill the whole space between the knives and the shafts of the retarders. At the same time the knives will be feeding forward the lower portions of the bundles toward the cylinder. As the tops of the bundles move forward they will be engaged by the third set of retarding-wheels to prevent piling up in front of the cylinder and the feeding of bunches of grain thereto, which might cause "slugging" of the cylinders and poor threshing. The speed of the revolving retarding-wheels gradually decreases from the outer toward the inner set, so that as the bundles are loosened and driven forward by the rapidly-revolving knives the upper portions thereof will be held back after leaving the carrier and even when near the cylinder. When the operation of threshing is completed, the inner end of the outer carrier-section may be pushed up by the person in charge and with very little effort the section may be swung in under the inner section, which will be raised up in the manner heretofore described to permit the outer section to clear all obstructions and be suspended in an inoperative position beneath the feeder-frame.

I claim as my invention—

1. In a band-cutter and feeder, the combination, with a cylinder, of a bundle-carrier, rotary means disposed between said cylinder and carrier for cutting the bundle-bands and spreading the grain, an unobstructed space being provided between said cylinder and the band-cutters, a series of rapidly-revolving picker-wheels mounted above the discharge end of said carrier and near said cutting means and adapted to retard the bundles and loosen them up during the band-cutting operation, a second set of revolving picker-wheels located above said band-cutting means and operated at a slower speed and adapted to engage the tops of the bundles after the bands are cut and temporarily hold the same while the lower portions of the bundles are loosened and spread and advanced toward the cylinder by said band-cutting means.

2. In a band-cutter and feeder, the combination, with a cylinder, of a bundle-carrier, rotary means disposed between said cylinder and carrier for cutting the bundle-bands and spreading the grain, an unobstructed space being provided between said cylinder and the band-cutter, a series of revolving picker-wheels mounted above the discharge end of said carrier and moving at a higher speed than said carrier and adapted to retard the bundles during the band-cutting operation, a second series of revolving picker-wheels located over said band-cutting means and operating at a slower speed than said first set, the fingers of said second set of wheels being longer than those of the first set and lapping by the same to clean the grain therefrom and adapted to engage and hold back the tops of the bundles after the bands are cut and while the knives are loosening and shaking up the lower portion of the bundles and feeding the same forward toward the cylinder, substantially as described.

3. In a band-cutter and feeder, the combination, with a cylinder, of a bundle-carrier, rotary means disposed between said cylinder and carrier for cutting the bundle-bands and feeding the grain, an unobstructed space being provided between said cylinder and the band-cutters, a series of rapidly-revolving picker-wheels mounted above the discharge end of said carrier adapted to engage and retard the bundles while the bands are being cut, a second series of revolving picker-wheels located over said band-cutting means and operated at a slower speed and adapted to engage the tops of the bundles and temporarily hold the same while the grain is being loosened and spread and the lower portions of the bundles advanced toward the cylinder by said band-cutting means, and a third set of retarding-wheels provided above and near said cylinder to engage the grain and insure the feeding of the same in a uniform continuous stream to said cylinder.

4. In a band-cutter and feeder, the combination, with a cylinder, of a bundle-carrier, rotary means disposed between said cylinder and carrier for cutting the bundle-bands and spreading the grain, an unobstructed space being provided between said cylinder and the band-cutters, a series of rapidly-revolving picker-wheels mounted above the discharge end of said carrier and moving at a higher speed and adapted to direct the bundles toward said band-cutting means and retard them during the band-cutting operation, a second series of revolving picker-wheels located over said band-cutting means and operating at a slower speed and adapted to engage and temporarily hold back the tops of the bundles while the grain is being spread and loosened and the lower portions of the bundles fed forward toward the cylinder by said band-cutting means, and a third set of retarding-wheels provided near said second set and coöperating therewith to cause a uniform, continuous feed to the cylinder, and means for raising or lowering said third set of wheels.

5. In a band-cutter and feeder, the combination, with a cylinder, of a bundle-carrier, rotary means disposed between said cylinder and carrier for cutting the bundle-bands and spreading the grain, a series of revolving picker-wheels located above said band-cutting means and operating at a slower speed, the fingers of said wheels being of sufficient length to engage the tops of the bundles and retard the same while the lower portions of the bundles are loosened and shaken and fed forward toward the cylinder by said band-cutting means, a series of revolving wheels provided near said cylinder and having fingers that coöperate with the fingers of said first-described series to clean the grain therefrom and hold back or retard the top of the stream of grain as it is fed toward the cylinder, and means for raising or lowering said last-described series of wheels to adapt them for use with different kinds of grain, substantially as described.

6. In a band-cutter and feeder, the combination, with a cylinder, of a bundle-carrier, rotary means disposed between said cylinder and carrier, for cutting the bundle-bands and spreading the grain, feed-limiting devices overhanging the discharge end of said carrier and adapted to engage the overplus bundles and throw them toward the receiving end of the same, a series of revolving picker-wheels mounted above the discharge end of said carrier and moving at a higher speed than said carrier and adapted to retard the bundles during the band-cutting operation, a second series of revolving wheels located over said band-cutting means and operating at a slower speed than said first set and adapted to engage the tops of the bundles after the bands are cut and temporarily hold back the same while the lower portions thereof are loosened and spread and advanced toward the cylinder by said band-cutting means.

7. The combination, with a band-cutter and feeder-casing, of a bundle-carrier frame hinged thereon and composed of two sections hinged together, timbers secured to said casing and projecting out beyond the same upon each side of the inner carrier-section and upon substantially the same level therewith, said timbers terminating near the abutting hinged ends of said sections and below the level of the inner end of the inner carrier-section, bearings provided on said timbers above and near said abutting ends, and flexible connections provided between said casing and the outer carrier-section, said flexible connections being arranged to rest upon said bearings, whereby, when the hinges connecting said sections are lifted past a line drawn between the pivots of said inner section on the casing and the point of attachment of said flexible connections to said outer section, the connected ends of said sections will be lifted automatically to allow the outer section to clear obstructions and aid the operator in folding the carrier.

8. In a machine of the class described, the combination, with a machine-casing, of the bundle-carrier connected therewith, arms pivoted on said casing and overhanging the discharge end of said carrier, means for tilting said arms vertically, a multiple-crank shaft mounted on the outer ends of said arms, a series of kickers 32 pivoted on said shaft, bars 35 pivoted on said arms, a rod 33, links connecting said rod and said kickers, respectively, and links 36 connecting said levers and said casing, substantially as described and for the purpose set forth.

9. The combination, with a band-cutter and feeder-casing, of a bundle-carrier frame hinged thereon and composed of two sections hinged together, supports provided upon each side of and near the abutting ends of said sections and above the hinges connecting the same, rods secured respectively to said casing and to the outer of said hinged sections, and flexible means connecting said rods and arranged to bear upon said supports, whereby when the hinges connecting said sections are elevated past a line drawn between the pivots of the inner section on the feeder-casing and the rod connections to the outer section the hinged ends of said sections will be lifted automatically to allow the outer section to clear obstructions and aid the operator in folding the carrier.

10. In a machine of the class described, the combination, with a casing and the bundle-carrier connected thereto, of bars pivoted on said casing and overhanging the discharge end of said carrier, means for adjusting said bars to permit said overhanging ends to be raised or lowered, a crank-shaft mounted on the outer ends of said bars, means for driving said shaft, a series of kickers pivoted on said shaft and adapted to engage and throw back the excess bundles brought up by said carrier, a shaft 33 connecting the inner ends of said kickers and pivoted connections provided between said shaft 33 and said machine-casing, substantially as described.

11. In a machine of the class described, the combination, with a machine-casing, of the bundle-carrier connected therewith, bars pivoted on said casing and overhanging the discharge end of said carrier, means for tilting said bars vertically, a multiple-crank shaft mounted on the outer ends of said bars, a series of kickers 32 pivoted on said shaft, levers 35 pivoted on said bars, a shaft 33, links connecting said shaft 33 and said kickers, respectively, and links 36 connecting said levers and said casing, substantially as described and for the purpose set forth.

In witness whereof I have hereunto set my hand this 30th day of December, 1901.

AUGUST J. HEINE.

In presence of—
RICHARD PAUL,
M. C. NOONAN.